United States Patent [19]

Bowerman et al.

[11] 4,210,777
[45] Jul. 1, 1980

[54] PSEUDO-TRANSPARENT STOP BIT GENERATOR

[75] Inventors: John J. Bowerman, Rock Ridge; John F. Wilson, Frederick, both of Md.

[73] Assignee: Frederick Electronics Corp., Frederick, Md.

[21] Appl. No.: 915,725

[22] Filed: Jun. 15, 1978

[51] Int. Cl.² .......................................... H04L 25/38
[52] U.S. Cl. .................................. 375/117; 364/200; 375/8
[58] Field of Search ..................... 178/53.1 R, 53.1 A, 178/69.1, 15 BS

[56] References Cited

U.S. PATENT DOCUMENTS

| | | | |
|---|---|---|---|
| 3,632,875 | 1/1972 | Glasson | 178/53.1 A |
| 3,702,900 | 11/1972 | Sturzinger | 178/53.1 R |

Primary Examiner—Benedict V. Safourek
Attorney, Agent, or Firm—Arnold, White & Durkee

[57] ABSTRACT

In a Telex switching system line terminator unit having means to transmit a character from the terminator to its terminal, in which the character is transmitted in a serial mode and terminated by a stop bit, an improvement in the manner of generating the stop bit is provided. A variable length stop bit is dynamically generated for each character transmitted such that the length of the stop bit is changed as the time required by the calling terminal to transmit the character to its terminator unit decreases over that required by the called terminator unit to transmit the character to the called terminal. Patterns in the rate of transfer of characters from the calling terminator unit to the called terminator unit are monitored to control the length of the stop bit.

23 Claims, 10 Drawing Figures

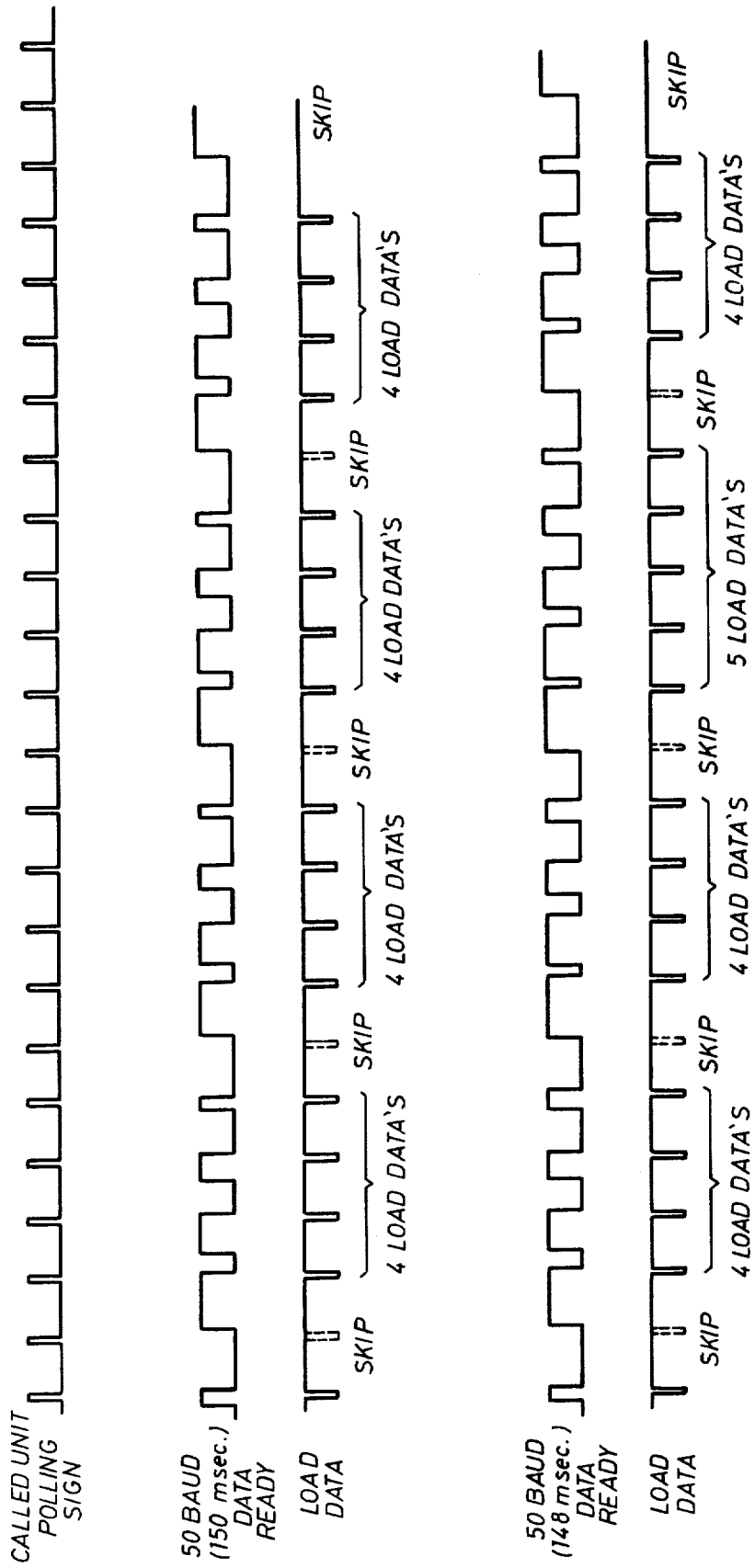

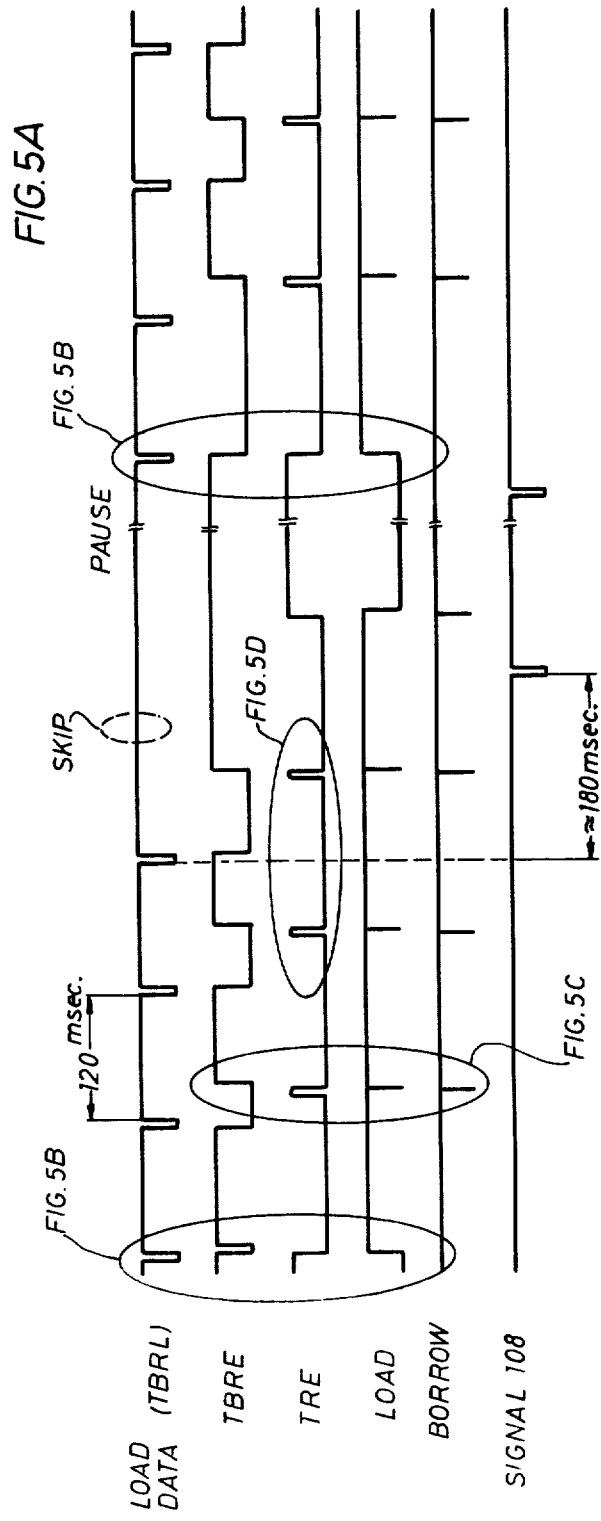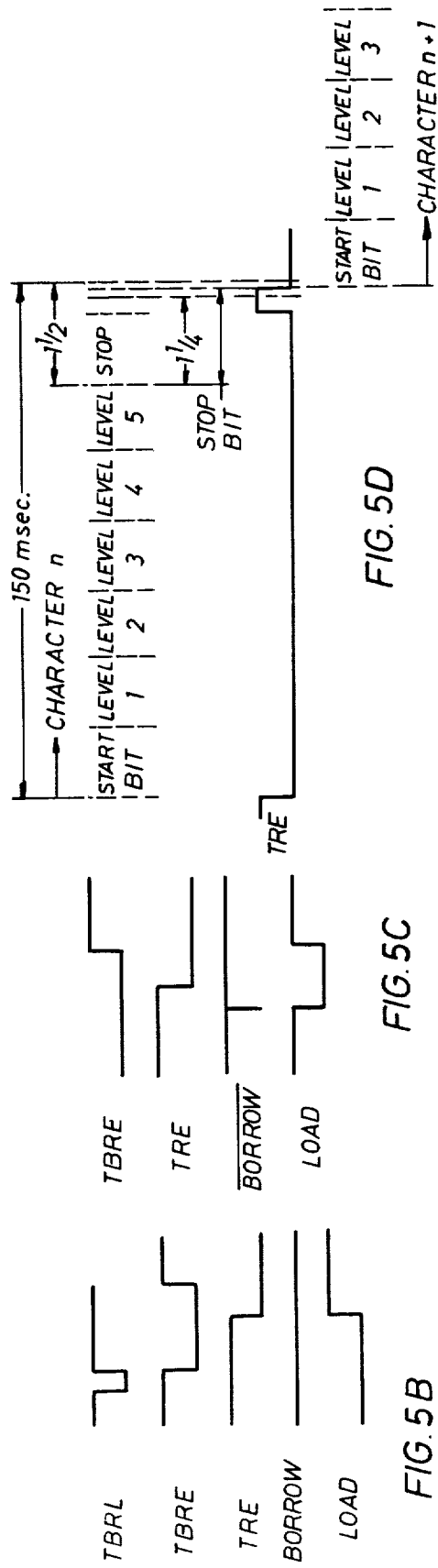

PSEUDO-TRANSPARENT STOP BIT GENERATOR

CROSS-REFERENCE TO RELATED APPLICATIONS

Reference is made in the Description of the Preferred Embodiment to a line terminator unit having as one of its components a "keyer" for transmitting serial information from the terminator unit to its terminal. Filed currently with this application is a related application covering an improved design of a line terminator keyer that is assigned to the same assignee of the present invention.

BACKGROUND OF THE INVENTION

This invention relates generally to a teletype switching system for example, of the Telex type in which terminator units are provided for each customer or terminal that is connected to the system. More particularly, this invention concerns the generation of a stop bit by the terminator unit during the transmission of a character from a terminator unit to its terminal. The stop bit is generated at the end of each character transmitted and signifies to the terminal that the character has been sent.

Each terminal that is connected to the switching system communicates with its terminator unit either by direct wire connections or over a radio link. A typical Telex switching system uses a central processing unit (CPU) to control the communications between terminator units and consequently between terminals. The CPU is programmed to sequentially scan or pole each terminator unit, at a fixed sample rate, to inquire as to the status of the terminator unit and to receive or transmit data to the unit. In this way, if a terminator unit has received a character from its terminal and stored it in its memory, the CPU can, at the polling time for that terminator unit, transfer the character to another terminator unit. For the above conditions, the terminal which sent the character to its terminator unit is referred to as the calling terminal, while the terminal to which that character was sent is referred to as the called terminal. At the appropriate polling time, the character is transferred to the selected terminator unit by the CPU. The selected terminator unit then transmits the character to its terminal, thus completing the communication link between the calling and called terminals.

A character is typically transmitted between terminals at a 50 baud rate and consists of a five level code. This is commonly referred to as a baudot code. For a baudot code, each level of the character is transmitted serially beginning with a start bit and ending with a stop bit. The stop bit is characteristically equal to one and one-half bit-time intervals whereas the start bit and each of the five character level bits are one bit time. For a baudot code, the total transmission time for each character is 150 milliseconds. This corresponds to a character transmission rate of 400 characters per minute.

As long as the sending terminal is communicating with its terminator unit over wire lines, the prior-art methods of generating a stop bit for the character transmitted to a called terminal are acceptable. However, when the sending terminal is communicating with its terminator over a radio link, a problem arises in differences in transmission times between what is generated from the calling terminal to its terminator unit and that generated from the called terminator unit to its terminal. That is, the radio link increases the character transmission rate from calling terminal to terminator unit over that which results at the called terminal. Characters arrive at the calling terminator unit over the radio link at a rate of 411 characters per minute. The nature of a radio link requires a faster transmission rate because the radio link wants a little extra time to be available in case it has to request a re-transmission of a character out of the many that are being transmitted when transmission errors have been detected. Since the radio link buffers incoming characters from the calling terminal before transmission, the faster data-transmission time allows re-transmission of erroneous data without losing any of the characters continually being outputted by the calling terminal to the radio link buffer.

A faster transmission rate is accomplished by transmitting a stop bit length of 1-9/32 bit-time units instead of the normal 1-½ units. In a computerized Telex exchange the computer acts as a sampling device which transfers data from one terminator to another terminator. Therefore by basic communications theory the computer must be programmed to transfer characters at a rate equal to or greater than the character rate. By the same reasoning, the called terminator will output characters to its terminal at a rate equal to or faster than the character rate arriving at the calling terminator. Since the computer samples at a rate faster than the incoming character rate, there will be times when the computers samples the calling terminator and there will not be a character ready for transfer. Likewise, the called terminator, by outputting characters at a faster rate than it receives them, will catch up and have to wait. However, this faster character transmission rate causes the character printing at the receiving terminal to appear erratic because the called terminal periodically waits on the next character from its terminator unit. This results because the called terminator is outputing a shortened stop bit character to get a faster transmission and the CPU must skip a polling time before sending the next character to the called terminator unit.

The called terminal eventually catches up, but must wait until the next polling time before it can receive its next character. This waiting period is reflected as an objectionable erratic printing characteristic at the terminal. Also, operation with a continuously shortened stop bit increases the probability for garbling of the date in the telex system. Therefore, it would be advantageous to provide a terminator unit that could vary the length of the stop bit for each character transmitted between the called termintor unit and its terminal so that that transmission rate is essentially equal to the rate at which the calling terminator unit is receiving the characters over the radio link.

It would also be advantageous to provide a variable stop bit whose length is varied over a certain range in response to a pattern in the number of characters that are transmitted between skips in the character transmission (the group of characters between skips is referred to as a frame). In this manner, the stop bit length will be adjusted dynamically as the rate of transmission of characters from a calling to a called terminal varies due to the presence of a radio link.

SUMMARY OF THE INVENTION

In accordance with this invention, a novel circuit for a line terminator unit is provided for generating a variable length stop bit. This stop bit signifies the end of a character transmitted from a terminator unit to its terminal. By varying the length of the stop bit, the total time required to serially transmit the character information can be modulated.

Each terminal of the system to which characters are to be transmitted for printing receives the characters, one after the other, with an expected interruption or skip in the sending of these characters. This skip results from the slower transmission time require for the calling terminal to transmit characters to its terminator unit than the time required by the CPU to periodically poll the called terminator unit to give it the next character to be printed.

As the transmission time of a calling terminal decreases, the number of characters that the CPU can transfer to the called terminator unit before a skip must occur changes. For any given character length, the number of characters transferred until there is a skip can be determined by solving the following equation $$N \times C = S \times (N+1)$$

where
N = number of characters
C = character time
S = time interval between computer samples.

Means are provided for counting the number of characters that are transferred to the called terminator unit between skips. Means are also provided to detect the presence of the skip, and for each skip to store the results of the character count since the last skip. The counting means for the transferred characters determines if the number of characters transferred was greater than a minimum number, and if so stores a logic 1. Otherwise, it stores a logic 0.

Means are provided to generate a variable length stop bit for the transferred characters as they are serially transmitted to the called terminal, such that the length of the stop bit is controlled by the count for a fixed number of preceding skip intervals.

BRIEF DESCRIPTION OF THE DRAWINGS

For a fuller understanding of the nature and objects of the invention, reference should be had to the following detailed description taken in connection with the accompanying drawings, in which:

FIG. 4 is a timing diagram illustrating the relationship between the calling terminator unit's DATA READY signal and the called terminator unit's LOAD DATA signal;

FIG. 5(a), (b), (c) and (d) are timing diagrams of the signals for the stop bit delay load 132.

Similar reference characters refer to similar parts throughout the several views of the drawings.

DESCRIPTION OF THE PREFERRED EMBODIMENTS

TABLE OF CONTENTS

GENERAL DISCUSSION

UART AND STOP BIT CLOCK GENERATOR 102 (FIG. 2)
1. Transmit/Delay Clock Enable 130
2. UART Transmit Clock 116
3. Stop Bit Clock Generator 120

Figure 3A:
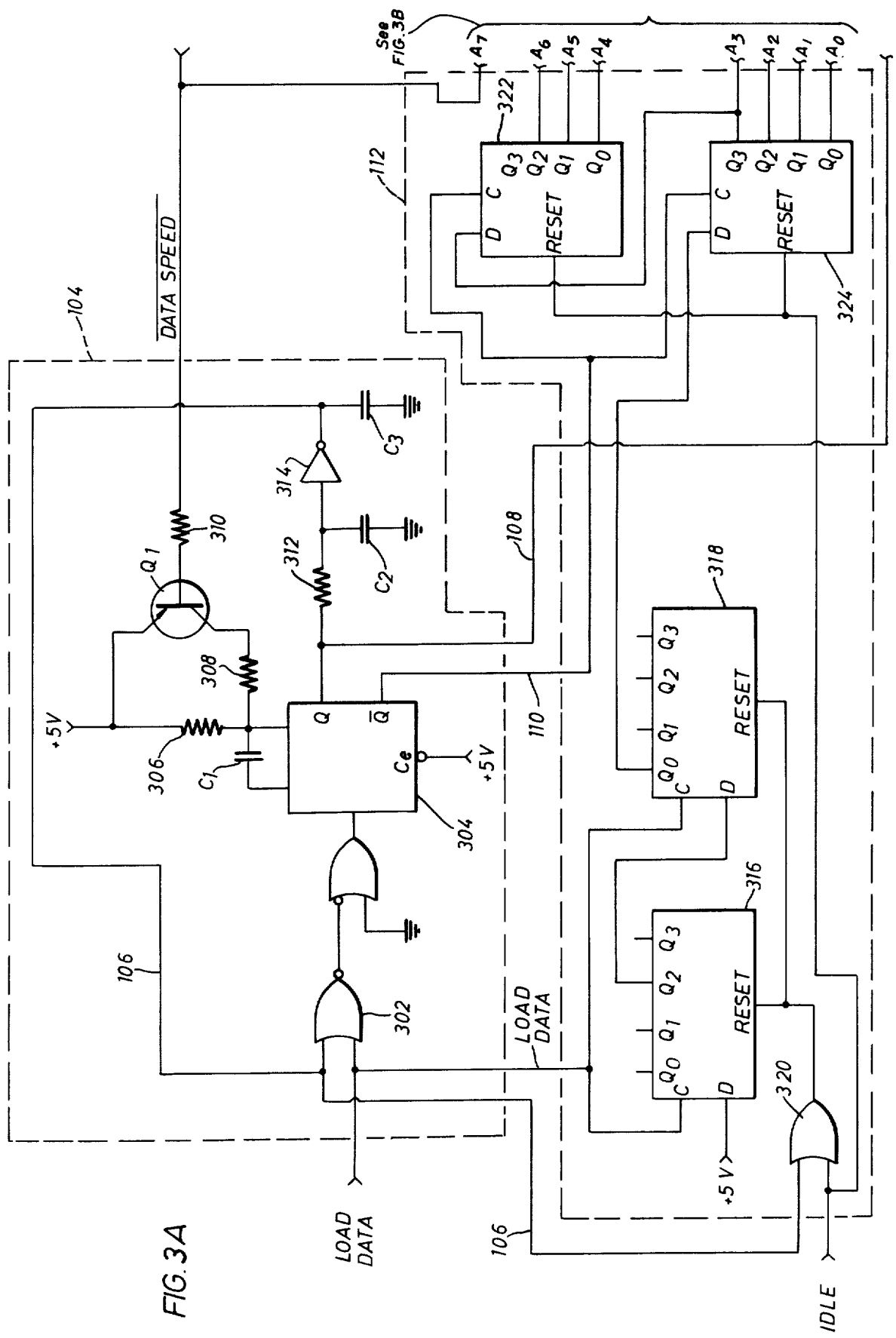
FIGS. 3(a) and 3(b) are the circuit diagrams of the stop bit length generator 100.
Figure 3B:
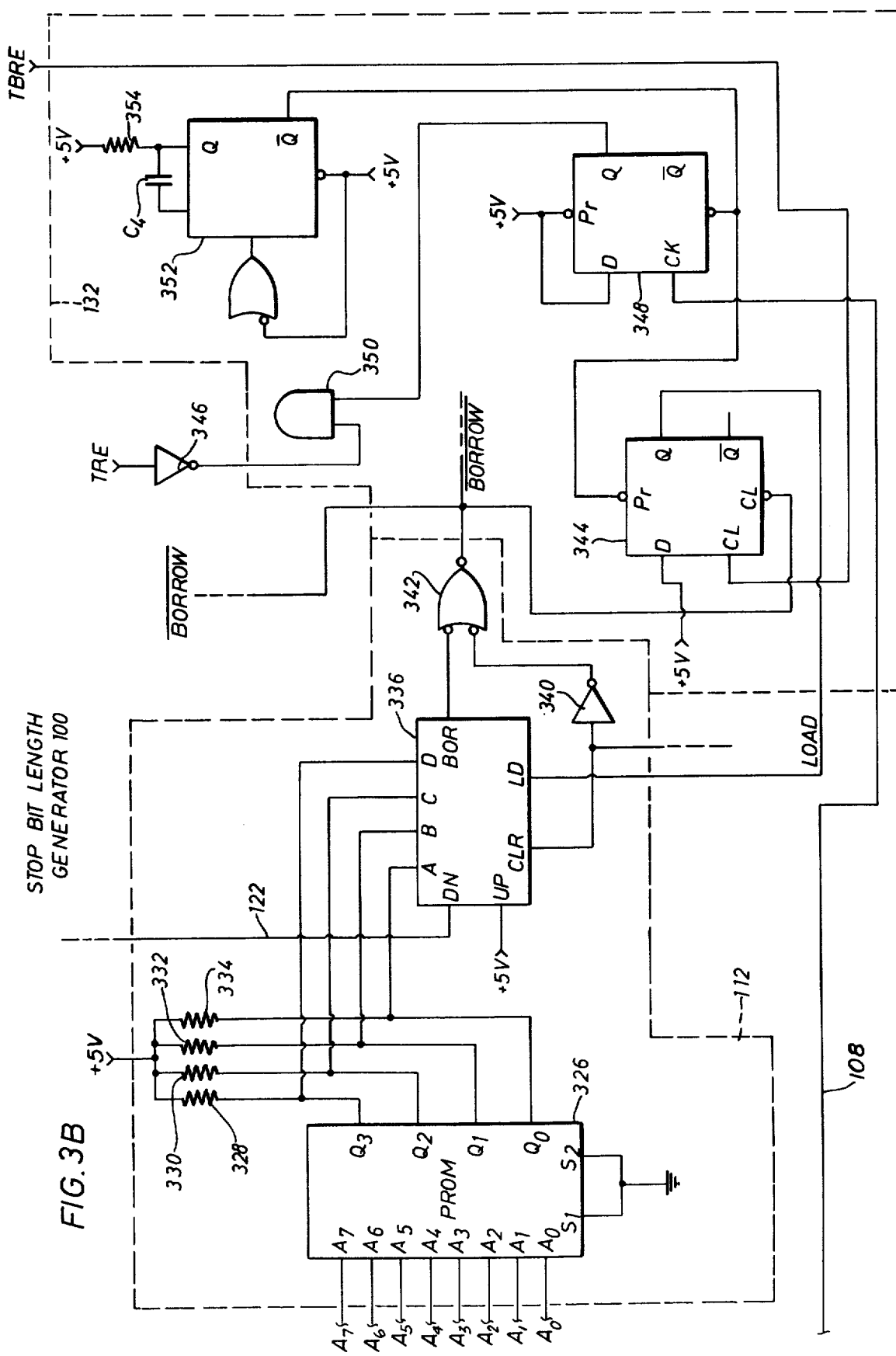

STOP BIT LENGTH GENERATOR 100 (FIGS. 3(a) and 3(b))
1. Skip Indicator 104
2. Stop Bit Delay Generator 112
3. Stop Bit Delay Load 132

GENERAL DISCUSSION

It will be helpful in understanding the following discussion to define certain logic terms. Each of the logic signals to which reference is made in the following discussions will have one of two possible logic states, a logic 1 or a logic 0. A logic signal will be designated as a true signal without a bar over the mnenomic. As an example, CLOCK would be a true signal while $\overline{CLOCK}$ would be its inverse. Each logic signal, be it the true signal or its inverse, will have an asserted and unasserted state. In the case of CLOCK, a true signal, the asserted state will be a logic 1 and the unasserted state a logic 0. For $\overline{CLOCK}$, the reverse is true, the asserted state is logic 0 and the unasserted state is logic 1. A signal goes "true" when it switches from the unasserted to the asserted state and vice versa when it goes "false." Lastly, a flip-flop is in a logic 0 state when the Q output is at a logic 0 and the $\overline{Q}$ is at a logic 1. In a logic 1 state the outputs of the flip-flop are in the reverse states.

Figure 1A:
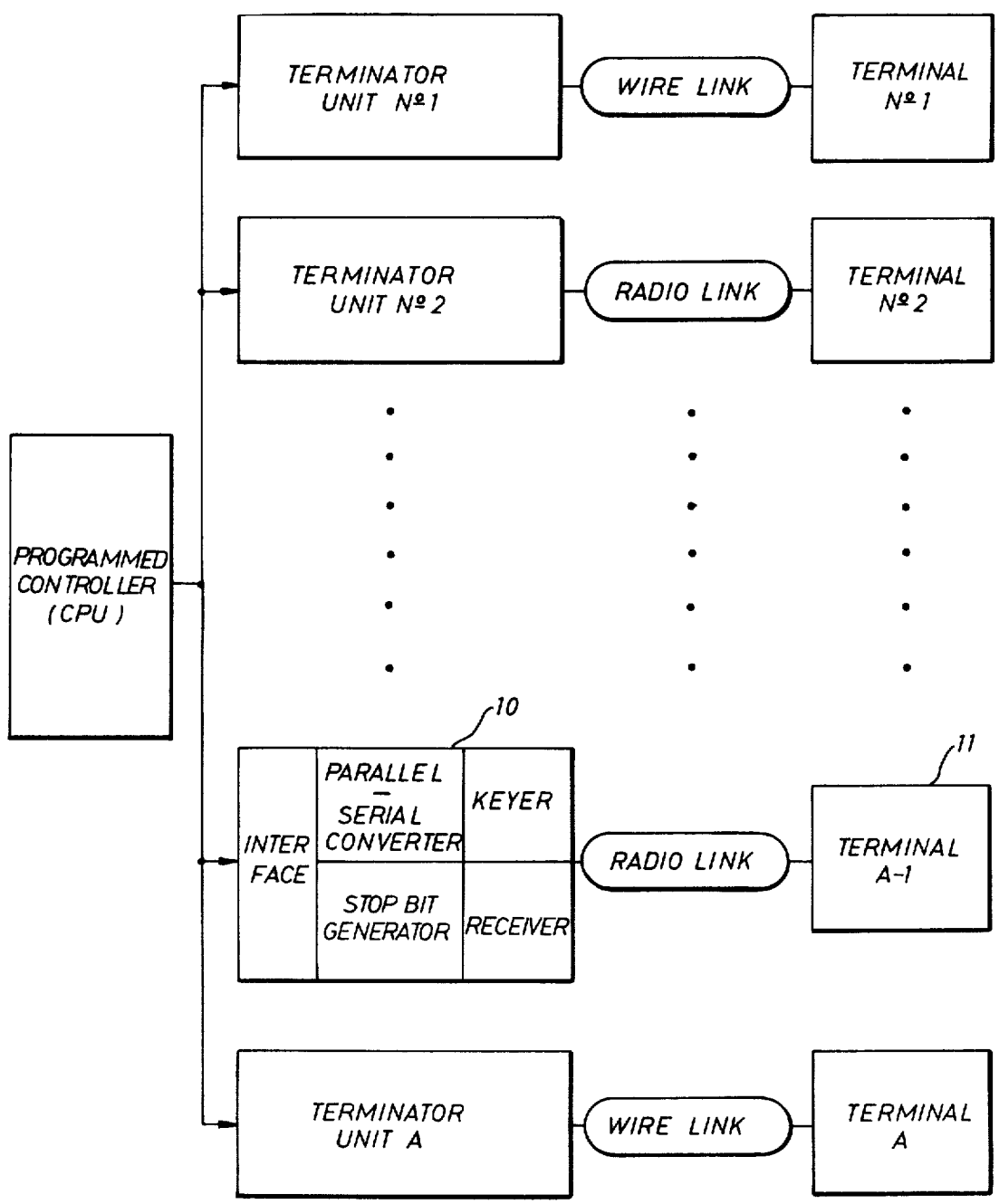
FIG. 1(a) is a block diagram of a basic computer-controlled switching system.

Refer first to FIG. 1(a) which illustrates the basic configuration of a computer-controlled switching system in which each customer terminal is connected to the CPU through terminator units. The communication link between the customer terminal and its terminator unit can either be by wire lines or by radio link. The CPU, in response to a calling terminal request, transmits data received at the calling terminator unit to the called terminator unit, thereby establishing communication between the calling and called terminals. A typical terminator unit 10 is shown in FIG. 1(a), composed of interface circuits to interface the terminator unit to the CPU, parallel-serial convertor circuits to convert the parallel data of the CPU to the serial data of a terminal and vice versa, a keyer circuit to transmit serial data to the terminal, and a receiver circuit to receive serial data from the terminal. The interface circuits are of a standard design for interfacing between a central processing unit, such as a Digital Equipment Corporation PDP-11 mini-computer, and a peripheral unit. The parallel-serial converter is of typical design, such as a universal asynchronous receiver/transmitter integrated circuit manufactured by Harris Semiconductor, Model 6402. The keyer circuit could be of standard design or an improved keyer design such as that disclosed in the above-referenced United States patent application which is incorporated herein for all purposes. The receiver circuit likewise may be of standard design for terminator units known and practiced in the art.

Because of the problems caused by differences in the calling character transmission time when a radio link between the calling terminal and its terminator is used and the time to transmit the character to the called terminal from its terminator unit, it is desirable to provide a way to vary the called transmission time to correspond to the calling transmission time. This is accomplished in the present invention by detecting the calling character transmission pattern. This involves determining how many characters are transmitted per frame for a given number of frames, and then modulating the stop bit length of the transmitted character to the called terminal according to that pattern.

The preferred embodiment of the present invention is best understood by now turning to FIG. 4, which illustrates the timing relationship between the calling terminator unit's DATA READY signal and the called terminator unit's LOAD DATA signal for two different calling terminal character transmission rates. The signal DATA READY is generated by a terminator unit when it has received a character from its terminal. The signal LOAD DATA is generated by the CPU when it transfers a character to a terminator unit. Each terminator unit, and therefore each terminal, during conversation is sequentially polled by the CPU. At the polling time, data can be read from the polled unit and outputted to the terminator it is in conversation with. In operation, the CPU requests the status of the unit. According to the results of this inquiry, the CPU may respond by initiating a communications link between that terminator unit as the calling terminal and another terminator unit, identified by the calling unit, as the called terminator unit. During this communication link, the signal DATA READY is generated in the calling terminator unit when a data character has been transmitted from the calling terminal to that terminator unit. This signal, when detected at the polling time, causes the CPU to move the transmitted character from the calling terminator unit to the called terminator unit. When the CPU transmits the stored character to the called terminator unit, it generates the signal LOAD DATA to that terminator. Because each of the terminator units connected to the CPU in the present embodiment are sequentially polled at a fixed 120 millisecond sample rate, and since each data character is transmitted from terminal to terminator at a slower rate of 150 milliseconds, the timing relationship between DATA READY for the calling terminator and LOAD DATA for the called terminator varies. However, the time displacement between the sensing of the calling terminator DATA READY by the CPU and the called terminator LOAD DATA following that sensing will never exceed 120 milliseconds.

Shown in FIG. 4 are patterns in LOAD DATA signals that result when the calling terminal transmits data at 150 milliseconds and when it transmits at 148 milliseconds. It can be seen that when the transmission rate is 150 milliseconds, only four characters are transmitted to the called terminator unit before a pause or skip in data must occur. As discussed previously, this pause results because the transmission rate is slower than the polling rate. When a pause or skip occurs, no LOAD DATA signal is generated to the called terminator unit because the next character to be transmitted has not been received from the calling terminal, i.e., a DATA READY signal has not been generated since the last polling time for the calling terminator unit. The number of LOAD DATA signals that are generated between skips is called a frame. Thus, for a transmission speed of 150 milliseconds per character, a pattern of four LOAD DATA signals per frame occurs. Again referring to FIG. 4, when the transmission time from calling terminal to its terminator, is 148 milliseconds per character, a different pattern results. Because of the faster transmission time, occasionally a frame will be generated which contains five LOAD DATA signals.

There is a relationship between the transmission rate at which the calling terminal is operating and the number of LOAD DATA signals that are generated per frame. It is possible to use that relationship to equalize transmission rates between terminals. To do so, the pattern in LOAD DATA signals per frame is examined over seven consecutive frames. Having established the pattern, it is possible to make, within the accuracy that digital implementation can achieve, the time required to transmit the character by the called terminator unit to its terminal equal to the calling terminal's transmission time to its terminator unit.

Figure 1B:
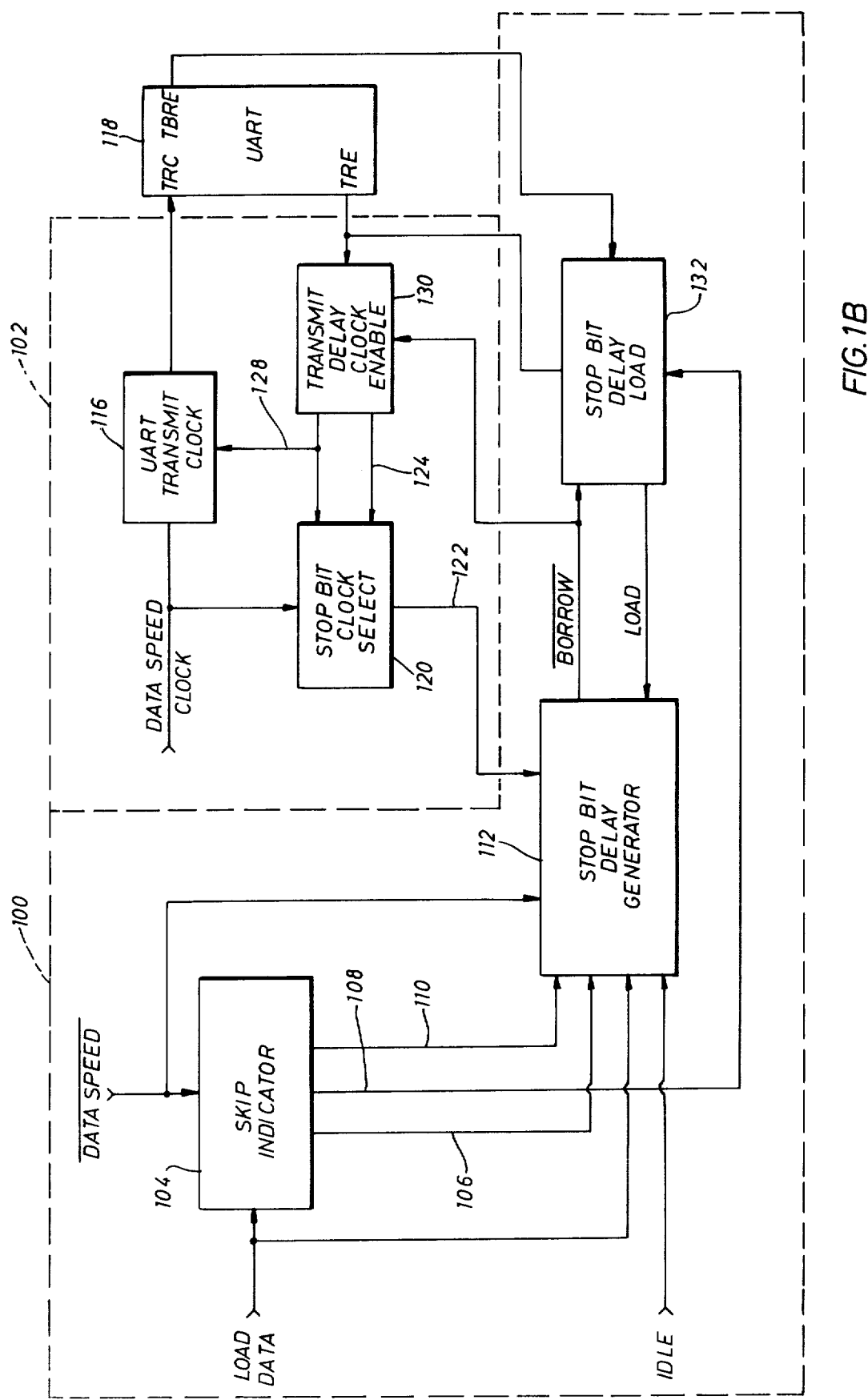
FIG. 1(b) is a block diagram of the pseudo-transparent stop bit generator.

Turning now to FIG. 1(b), which illustrates the block diagram of the psuedo-transparent stop bit generator, the signal LOAD DATA is shown inputted to skip indicator 104 and stop bit delay generator 112. Skip indicator 104 responds to the absence or a skip in the occurrence of LOAD DATA (see FIG. 4) to generate output signals that represent the occurrence of the skip condition. The signal $\overline{\text{DATA SPEED}}$ is inputted to skip indicator 104 to select one of two transmission speeds, one speed corresponding to 150 milliseconds per character (50 baud) and the other at a different speed. For the higher transmission speed, the stop bit length will be fixed and for the 50 baud rate, the stop bit length will be allowed to vary. $\overline{\text{DATA SPEED}}$ is also inputted to stop bit delay generator 112 to provide an address signal whose function will be more fully described below. Although a variable length stop bit for a 50 baud transmission rate is disclosed, a different baud rate is possible when the appropriate changes are made in the circuits that will be evident to a person of ordinary skill in the art having the benefit of the following discussion.

The output signals 106 and 110 of skip indicator 104 are inputted to stop bit delay generator 112 while output signal 108 is inputted to stop bit delay load 132. Output signal 108 is the inverse of 110. Signal 106 is the inverse of signal 108 but has been delayed in time by a small amount. The purpose of this delay is more fully described in the discussion of stop bit delay generator 112. Skip indicator 104 generates a signal on line 108 approximately 180 milliseconds following the occurrence of the last LOAD DATA signal, provided that another LOAD DATA signal does not occur within that time frame. In other words, as long as LOAD DATA is occurring at a rate faster than 180 milliseconds, no output will be generated on any of the skip indicator 104 output lines. Stop bit delay generator 112 responds to the output signals of skip indicator 104 to count the number of LOAD DATA signals that occur in each frame and to generate an appropriate output timing signal to modulate the length of the stop bit for the next character to be transmitted, based on the count results of the last seven consecutive frames.

A universal asynchronous receiver-transmitter (UART) is provided in each terminator unit, first to receive the parallel digital character data from the CPU and serially transmit the data to a terminal, and second to receive the serial data from that terminal and transmit it as parallel data to the CPU. For the present invention, three signals from UART 118 are of interest: The transmit input clock (TRC); the transmit buffer register empty output signal (TBRE); and a transmit register empty output signal (TRE). A DATA SPEED CLOCK signal is provided in each terminator unit. This clock signal is thirty-two times the data transmission frequency that occurs to the called terminal. This clock signal is inputted to UART transmit clock 116 and stop bit clock select 120, which, along with transmit/delay clock enable 130, comprises the UART and stop bit clock generator 102. Depending upon the state of control signals 128 and 124 (generated by the transmit/delay clock enable 130), a clock signal will either be generated on line 122 to stop bit delay generator 112 or on TRC to UART 118. Output signals 128 and 124 from transmit/delay clock enable 130 are the logical inverse of each other.

Stop bit delay generator 112 functions to generate an output signal $\overline{BORROW}$ which terminates the stop bit for the current character being transmitted. The variable time interval generated in stop bit delay generator 112 is measured from the beginning of clock signals on line 122 until $\overline{BORROW}$ goes true, and is equal to an integer number of cycles of this clock signal. Stop bit delay load 132 updates stop bit delay generator 112 with a time-interval-determining number for each character that is to be transmitted. Stop bit delay load 132 responds to the signal TRE and TBRE from UART 118 and the signal 108 from skip indicator 104, to generate the signal LOAD that is inputted to the stop bit delay generator 112. The signal LOAD causes the stop bit delay generator 112 to update the delay increment for the next character to be transmitted. The timing relationship between the various signals that generate the LOAD signal is more fully set out in the discussion of the stop bit delay load 132.

UART AND STOP BIT CLOCK GENERATOR 102 (FIG. 2)

Figure 2:
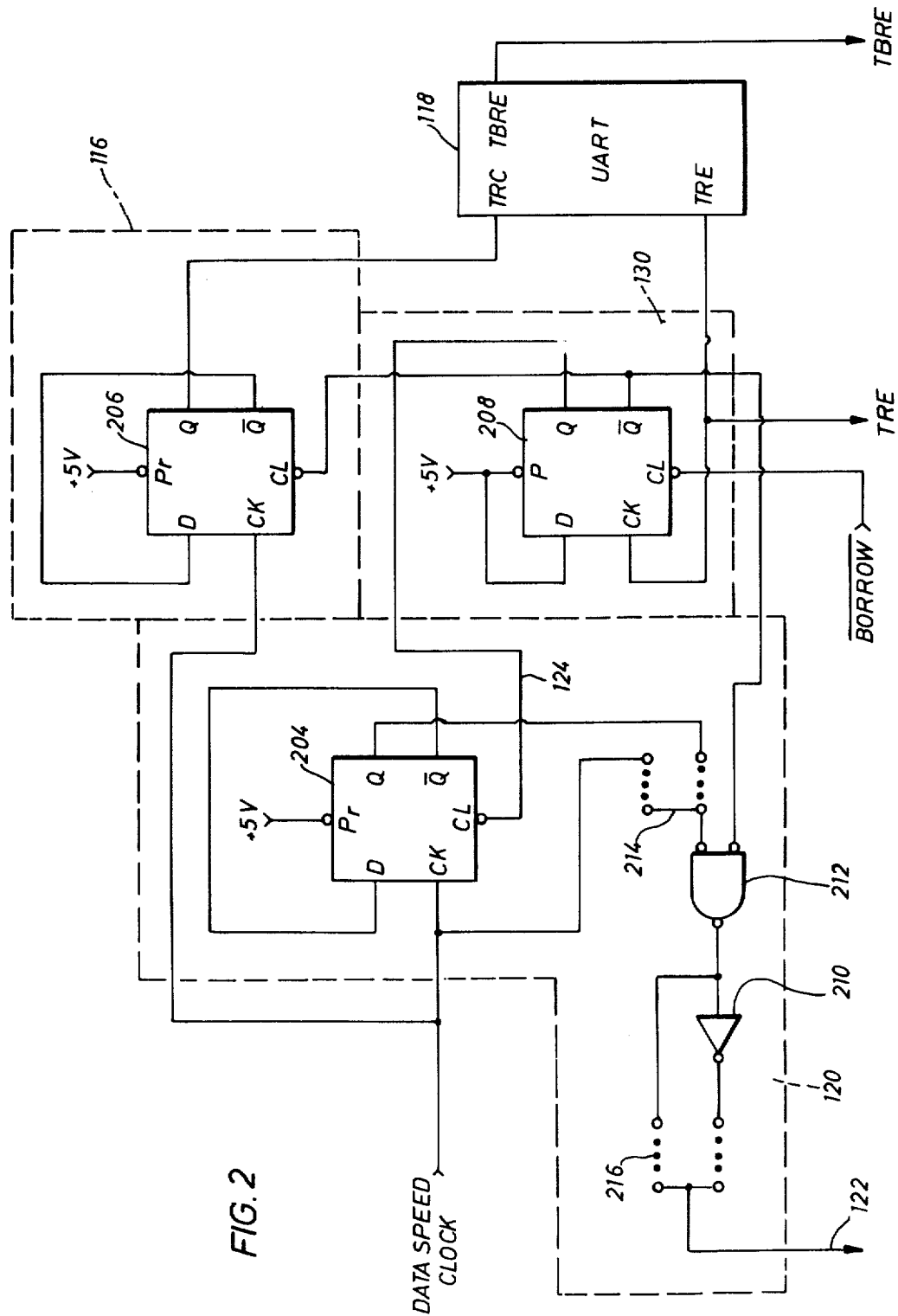
FIG. 2 is a schematic diagram of the universal asynchronous receiver transmitter (UART) and stop bit clock generator 102.

Turning now to FIG. 2, which illustrates the circuit diagram for the UART and stop bit clock generator 102, DATA SPEED CLOCK is the input clock signal that is used to generate the transmit clock signal TRC and the clock signal on line 122. Clock 122 is the clocking signal to the stop bit delay generator 112. The UART and stop bit clock generator 102 consists of stop bit clock select 120, UART transmit clock 116 and transmit/delay clock enable 130.

Transmit/delay Clock Enable 130

The transmit/delay clock enable 130 consists of a D flip-flop 208 that responds to two input signals, $\overline{BORROW}$ and TRE. The signal $\overline{BORROW}$, generated by stop bit delay generator 112, is inputted to the clear input of D flip-flop 208 to clear the flip-flop to a logic 0 when the $\overline{BORROW}$ signal goes true. The signal TRE, generated by the UART 118, clocks the D flip-flop 208 to a logic 1 when TRE goes true. The Q and $\overline{Q}$ output of flip-flop 208 are used as enable signals to UART transmit clock 116 and stop bit clock select 120. Output signal 124 from D flip-flop 208 provides a clear signal to flip-flop 204 of stop bit clock select 120 to inhibit the generation of clock signals on the Q output of flip-flop 204 when signal 124 is at a logic 0. When signal 124 is at a logic 1, flip-flop 204 responds to the signal DATA SPEED CLOCK to generate a clock signal on the Q output of flip-flop 204 that is half the frequency of DATA SPEED CLOCK. The $\overline{Q}$ output signal 128 of D flip-flop 208 provides a clear signal to flip-flop 206 of UART transmit clock 116 to enable that flip-flop to generate the transmit clock TRC that is also equal to one-half the frequency of DATA SPEED CLOCK when signal 128 is at a logic 1. When signal 128 is at a logic 0, no transmit clock signal will be generated on TRC, because flip-flop 206 will be cleared to a logic 0.

Referring now to FIGS. 5(a), 5(b) and 5(c), which illustrate the timing relationship between the signals $\overline{BORROW}$ and TRE, the signal TRE, as shown in FIG. 5(d), goes false at the start of the transmission of a character and remains in that logic state until the end of the first interval of the stop bit time. As shown in FIG. 2, the leading edge of TRE clocks enable flip-flop 208 of transmit/delay clock enable 130 to a logic 1, which in turn enables stop bit clock select 120 to generate clock signals on line 122. As discussed above, the occurrence of clock signals on line 122 begins the generation of the variable time interval for the stop bit. When the variable time interval of the stop bit has been generated, the signal $\overline{BORROW}$ goes true, thereby clearing flip-flop 208 of transmit/delay clock enable 130 to a logic 0. With flip-flop 208 in a logic 0, generation of clock signal TRC to the UART is enabled and clock signals on line 122 are terminated. In other words, when $\overline{BORROW}$ occurs, the stop bit interval for the current character has been generated thereby signaling the completion of the transmission of that character and the start of transmission of the next character, if one is to be transmitted.

UART Transmit Clock 116

Referring again to FIG. 2, enable signal 128, generated by transmit/delay clock enable 130, controls the generation of the clock signal TRC which is the Q output of D flip-flop 206. When signal 128 is at a logic 1, D flip-flop 206 divides DATA SPEED CLOCK by two to generate TRC clock. Therefore, the frequency of TRC is 16 times the transmission speed of UART 118. TRC is generated during the transmission of characters at all times except from the end of the first interval of the stop bit time (see FIG. 5(d)) until the end of the variable portion of the stop bit. When enable signal 128 is at a logic 0, no clock signals will occur on TRC. Signal 128 switches to a logic 0 with the leading edge of TRE to begin the variable portion of the stop bit and switches back to a logic 1 with the occurrence of $\overline{BORROW}$.

Stop Bit Clock Generator 120

Referring still to FIG. 2, with the leading edge of TRE, transmit/delay clock enable 130 enables flip-flop 204 to toggle. Transmit/delay clock enable 130 also provides the enabling signal 128 to NAND gate 212. When signal 128 is at a logic 0, the clock signal that is applied to jumper terminals 214 appear on the output of NAND gate 212. Jumper terminals 214 are provided to permit selection of either DATA SPEED CLOCK or one-half of DATA SPEED CLOCK to appear on clock signal line 122. The output of NAND gate 212 is inverted by inverter 210. Both the output of gate 212 and 210 is inputted to jumpers 216. Jumpers 216 are provided to permit selection of clocking on either a leading or trailing edge of the clock signal selected by jumpers 214. By providing a selection of two different clocking frequencies to appear on 122, the resolution of the generation of the stop bit delay interval can be increased when the higher frequency clock is selected. However, as will be discussed below, when the higher clock frequency is chosen, appropriate changes must be made in the stop bit length generator 100 to generate the same variable length stop bit as would be generated at the lower clock frequency.

STOP BIT LENGTH GENERATOR 100

(FIGS. 3(a) and 3(b))

Referring now to FIG. 3(a), stop bit length generator 100 is shown composed of skip indicator 104, stop bit delay generator 112 and stop bit delay load 132. Stop bit length generator 100 functions to modulate the stop bit length in response to the history of the transmission characteristics of the previous seven data frames. The signal LOAD DATA, that occurs each time the CPU transmits a character from its memory to the called terminator unit, is monitored to determine the number of LOAD DATA signals that occurred between skips. The LOAD DATA monitoring circuits count the number of occurrences of LOAD DATA that occur in each data frame and, depending upon whether there were four or five LOAD DATA pulses, changes the contents of a shift register whose output forms the address input to a programmable read only memory (PROM). The contents of the PROM, at the specified address, determine the stop bit delay length. A down counter is loaded with the contents of the output of the PROM at the start of transmission of a character. When the signal TRE has a positive transition (see FIG. 5(d)), a clock signal is provided to the down counter to count down to zero from the loaded count provided by the PROM. When a count of 0 is reached, the signal $\overline{\text{BORROW}}$ goes true to signal the end of the variable portion of the stop bit and stop the clocking of the down counter.

Skip Indicator 104

Skip indicator 104, as shown in FIG. 3(a), functions to generate output signals on lines 106, 108 and 110 when a skip in the signal LOAD DATA occurs. These output signals are generated as follows:

Retriggerable one-shot 304 is wired such that one of its outputs, signal 106, is fed back to one of its trigger inputs. With this feedback connection and having once been triggered, at the end of its time period it will retrigger itself to begin another time interval. The time period for retriggerable before the end of its time interval one-shot 304 is approximately 180 milliseconds for a data transmission speed of 50 baud. The time interval between the occurrences of LOAD DATA is 120 milliseconds. With the occurrence of each LOAD DATA, one-shot 304 is retriggered to beginning a new time interval but without generating output signals on lines 106, 108 or 110. When a skip in LOAD DATA occurs, one-shot 304 is not retriggered but continues to time out. During the triggered time interval of one-shot 304, the signal on line 108 is at a logic 1 and the signal on line 110 is at a logic 0. The logic 1 on signal line 108 charges capacitor C2 to a logic 1 through a resistor 312. The voltage across capacitor C2 appears on the input of invertor 314.

The output 106 of inverter 314 is normally at a logic 0 and is fed back as one input of NOR gate 302. The other input of NOR gate 302 is the signal LOAD DATA. The output of NOR gate 302 is at a logic 1 until the occurrence of either LOAD DATA or the output of invertor 314 changes from a logic 0 to a logic 1 when one-shot 304 times out. When one-shot 304 times out, the signal on line 108 goes to a logic 0, providing a discharge path through resistor 312 for the voltage on capacitor C2. The time constant of this discharge circuit delays the occurrence of a logic 0 to a logic 1 transmission of signal 106. The reason for delaying the pulse on signal line 108 from appearing as a coincident inverted pulse on line 106 is to permit the clock pulses on signal lines 108 and 110 to clock stop bit delay generator 112 and stop bit delay load 132, respectively, before the pulse on 106 retriggers one-shot 104 and resets counters 316 and 318 in stop bit delay generator 112. Capacitor C3 is tied to the output of invertor 314 to further delay the occurrence of the feedback retrigger pulse on 106. As a result of delaying the feedback pulse, a relatively short pulse is generated on signal lines 106, 108 and 110 when a skip or pause occurs in LOAD DATA.

The process of one-shot 304 timing out and retriggering itself continues as long as there are no LOAD DATA pulses. As mentioned above, the signal $\overline{\text{DATA SPEED}}$ selects one of two transmission rates. When false, $\overline{\text{DATA SPEED}}$ selects a time interval for one-shot 304 of approximately 180 milliseconds. When true, $\overline{\text{DATA SPEED}}$ causes transistor Q1 to conduct to connect resistor 308 in parallel with resistor 306. For $\overline{\text{DATA SPEED}}$ false the time constant for a one-shot 304 is controlled by the RC time constant of resistor 306 and capacitor C1. For $\overline{\text{DATA SPEED}}$ true other transmission speed selected and transistor Q1 conducting, the effective resistance in the RC network is halved by the parallel connection of resistor 308 to resitor 306. In this manner, the time interval of one-shot 304 is reduced. For this transmission rate, the stop bit length will be fixed.

Stop Bit Delay Generator 112

(FIGS. 3(a) and 3(b))

Refer to FIGS. 3(a) and 3(b), stop bit delay generator 112 functions to count the number of LOAD DATA signals that occur between skips in that signal. There will be either four or five LOAD DATA pulses per data frame. Binary counter 316 counts LOAD DATA pulses and if five LOAD DATA pulses occur, the $Q_2$ output of counter 316 enables counter 318 to count from a count of 0 to a count of 1 on the occurrence of the fifth pulse. This causes the $Q_0$ output of counter 318 to go true. The $Q_0$ output of counter 318 is inputted to a seven bit shift register comprised of two four bit shift registers 324 and 322 connected in series. At the end of each data frame, retriggerable one-shot 304 times out and generates a shift pulse on line 110 to clock the results of the counting of the previous data frame, indicated by the logic state of $Q_0$ of counter 318, into shift register 324. It will be appreciated by those skilled in the art that other circuits could be used to count the number of LOAD DATA signals that the binary counters 316 and 318, such as, a five bit shift register, a BCD counter, etc.

After the result of the counting has been shifted into the shift registers 324 and 322, signal 106 clears the counters 316 and 318 for counting LOAD DATA signals that occur in the next frame. The seven bits of shift registers 324 and 322, in association with the signal line $\overline{\text{DATA SPEED}}$, provide the eight bit input address to PROM 326. PROM 326 is a 256 by 4 bit memory. The output of the location specified by the input address lines of the PROM 326 is a four bit binary number that when loaded into down counter 336, determines the variable portion of the stop bit. The logic state of signal $\overline{\text{DATA SPEED}}$ divides PROM 326 into two sections, those addresses greater than 128 and those less than or equal to 128. For addresses less than or equal to 128 ($\overline{\text{DATA SPEED}}$ true), the contents of PROM 326 correspond to a fixed stop bit length required for the higher transmission rate. For addresses greater than 128

(DATA SPEED false), the content of PROM 326 corresponds to a variable stop bit length required for the lower transmission rate.

The seven bits of shift registers 324 and 322 represent the history or pattern in the number of LOAD DATA signals that occurred in each of the previous seven frames. It has been determined that for a given pattern, a particular stop bit time is desirable. The PROM 326 has been programmed to output a four bit binary count for each of the possible patterns that can occur over the last seven frames when the lower transmission rate is selected. Table I is a listing of the contents of PROM 326 for each of the 256 possible memory addresses that are used with a 50 baud character transmission rate.

TABLE I

| Decimal Address | Decimal Data Out | Decimal Address | Decimal Data Out |
|---|---|---|---|
| 0 | 15 | 171 | 09 |
| . | . | 172 | 10 |
| . | . | 173 | 09 |
| . | . | 174 | 09 |
| 128 | 15 | 175 | 09 |
| 129 | 09 | 176 | 12 |
| 130 | 09 | 177 | 09 |
| 131 | 09 | 178 | 09 |
| 132 | 10 | 179 | 09 |
| 133 | 09 | 180 | 10 |
| 134 | 09 | 181 | 09 |
| 135 | 09 | 182 | 09 |
| 136 | 11 | 183 | 09 |
| 137 | 09 | 184 | 11 |
| 138 | 09 | 185 | 09 |
| 139 | 09 | 186 | 09 |
| 140 | 10 | 187 | 09 |
| 141 | 09 | 188 | 10 |
| 142 | 09 | 189 | 09 |
| 143 | 09 | 190 | 09 |
| 144 | 12 | 191 | 09 |
| 145 | 09 | 192 | 14 |
| 146 | 09 | 193 | 09 |
| 147 | 09 | 194 | 09 |
| 148 | 10 | 195 | 09 |
| 149 | 09 | 196 | 10 |
| 150 | 09 | 197 | 09 |
| 151 | 09 | 198 | 09 |
| 152 | 11 | 199 | 09 |
| 153 | 09 | 200 | 11 |
| 154 | 09 | 201 | 09 |
| 155 | 09 | 202 | 09 |
| 156 | 10 | 203 | 09 |
| 157 | 09 | 204 | 10 |
| 158 | 09 | 205 | 09 |
| 159 | 09 | 206 | 09 |
| 160 | 13 | 207 | 09 |
| 161 | 09 | 208 | 12 |
| 162 | 09 | 209 | 09 |
| 163 | 09 | 210 | 09 |
| 164 | 10 | 211 | 09 |
| 165 | 09 | 212 | 10 |
| 166 | 09 | 213 | 09 |
| 167 | 09 | 214 | 09 |
| 168 | 11 | 215 | 09 |
| 169 | 09 | 216 | 11 |
| 170 | 09 | 217 | 09 |
| 218 | 09 | 237 | 09 |
| 219 | 09 | 238 | 09 |
| 220 | 10 | 239 | 09 |
| 221 | 09 | 240 | 12 |
| 222 | 09 | 241 | 09 |
| 223 | 09 | 242 | 09 |
| 224 | 13 | 243 | 09 |
| 225 | 09 | 244 | 10 |
| 226 | 09 | 245 | 09 |
| 227 | 09 | 246 | 09 |
| 228 | 10 | 247 | 09 |
| 229 | 09 | 248 | 11 |
| 230 | 09 | 249 | 09 |
| 231 | 09 | 250 | 09 |
| 232 | 11 | 251 | 09 |
| 233 | 09 | 252 | 10 |
| 234 | 09 | 253 | 09 |
| 235 | 09 | 254 | 09 |
| 236 | 10 | 255 | 09 |

The following is the source code listing of two computer programs written in BASIC computer language. The programs are used to generate and test the contents of PROM 326. The first program—the ROM GENERATOR PROGRAM—generates the contents of PROM 326 for a given character transmission rate, and the second program—the STOP BIT RUNNING PROGRAM—tests the values created by the generator program to verify that the stop bit generated by those values does not result in a lost character, i.e. the outputting of characters stays ahead of the inputting of characters.

The ROM GENERATOR PROGRAM requires the following inputs: an initial input character length corresponding to the desired baud rate; the first characters initial wait period in the receiving terminators input register; the initial output character length; and the number of passes through the program that are to be made. The number of characters transferred each pass will be a random number between 200 and 250. After each pass, a new input character length, over the range of 145 to 150 milliseconds, is randomly generated. The program simulates transfers from an input terminator to an output terminator with a processor sampling or transferring a character every 120 milliseconds. The program counts the number of characters transferred until there is a skip for seven consecutive skips, and generates a seven bit shift register pattern used as an address for a look-up table. For each pattern generated there is a preferred stop bit length for the outputted characters. A value is saved in the look-up table for each pattern generated. Since more than one stop bit length will generate the same shift register pattern, the shortest or worst case stop bit length for a given pattern is the value that is saved. At the completion of all the passes through the program, the contents of the look-up table should contain stop bit length values which can handle the worst case situations of input character lengths. As a final step however, the contents of the look-up table are made available for manual changes should they be desired.

The STOP BIT RUNNING PROGRAM is similar to the ROM GENERATOR PROGRAM except that the input stop bit length is not known. For the running program, the values generated in the generator program are used. Random input character lengths are generated to test the values calculated. If the transmission of output characters does not stay ahead of the transmission of input characters, then a lost character will result. If a character is lost, the program flags the operator indicating that the values in the look-up table must be modified.

ROM GENERATOR PROGRAM

4 PRINT" THIS IS A SEVEN BIT SHIFT REG ROM GENERATOR PROGRAM

ROM GENERATOR PROGRAM

```
5 ON ERROR GOTO 1040
7 X$=SYS(CHR$(6%)+CHR$(-7%)
10 INPUT' THE INITIAL OUTPUT CHARACTER LENGTH IN MS IS TO BE' ;02
20 INPUT' THE INITIAL INPUT CHARACTER LENGTH IN MS IS TO BE' ;I
30 DIM J(10)
40 OPEN' M2.ARY' AS FILE 2%
:DIM #2%,M2(127,15)
50 E1=O
56 RANDOMIZE
60 R1=.625
70 INPUT' THE INITIAL WAIT PERIOD IS TO BE' ;E1
71 E3=EI
80 S=120:L=140
100 INPUT' THE NUMBER OF PASSES IS TO Be' ;P2
120 A1$=MID(A$,1%,1%)
140 B1$=MID(B$,1%,1%)
160 PRINT' PASS' , 'INPUT LENG' , '# OF CHARA' , 'A' , 'MIN OUT'
170 A3=O
171 R4=O
172 P1=1
180 S=120:L=140
190 FOR J=O TO 10
200 J(J)=O
210 NEXT J
220 E=E3
230 0=02
240 T=O:O3=0
250 Z=O:Z1=O
260 A=I=S:B=O=S:E=S-E:C=S-E
270 G=O:N=O:P=O
280 X=0:K=O
290 D=O:Z=a:GO SUB 680
300 N1=O:O1=O
310 D=O:M=O:Q=O
320 Z=Z+1
330 C=C-A:IF C<=O THEN 390
340 GO SUB 680
350 M=O
360 D=D+B
370 IF D>S THEN GOTO 630
380 GO TO 320
390 IF MID(A$, 1%,1%)='Y' THEN PRINT'    C=' ; C
400 IF J(O)>4 THEN J(1)=1 ELSE J(1)=O
410 FOR J=9 TO 2 STEP -1
420 J(J)=J(J-1)
430 NEXT J
440 FOR J=8 TO 2 STEP -1
450 IF J(J)=1 THEN J(10)=J(10)+2**(J-2)
455 NEXT J
457 T=A3:IF T>7 THEN T=7
457 IF M2(J(10),15)<T THEN M2(J(10),15)=T
459 GO TO 491
461 PRINT J(O),
470 FOR J=2 TO 10
480 PRINT J(J);
490 NEXT J
491 IF J(10)>127 THEN STOP
492 A4=J(10)
493 M2(A4,A3)=A3
494 GO TO 500
498 PRINT M2(A4,A3)
500 J(O)=O: J(10)=O
510 IF M=1 THEN D=D+S:M=O
520 C=C+S:D=(D+0)-(2*S)
530 IF D=O THEN GO TO 570
540 F=O-D:IF N>O THEN F=O
550 GO SUB 680
560 GO TO 490
570 GO SUB 680
580 GO TO 380
590 IF N>O THEN GOTO 600
600 Z=O:N=N-1:IF N>O THEN N=O:Q=1
610 B=O-S:IF Q=O THEN D=D+O-B:GOTO 320
620 GOTO 310
630 IF C-A=O THEN GOTO 380
640 D=D-S:M=1:B=O-S:N=N+1:IF N>P THEN P=N
650 Z1=Z
660 GO TO 670
670 Z=O:GO TO 320
680 K=K+1
690 J(O)=J(O)+1
```

| ROM GENERATOR PROGRAM |
| --- |
| 700 O=G−T*R1
710 IF MID(B$,1%,1%)='Y' THEN PRINTK;Z;Z1;N;N1;T;C;D;O;F
720 F=O
730 IF O>L THEN O=L
740 IF O>=O1 THEN 760
750 O1=O
760 IF O>L THEN O=L
770 B=O−S
780 IF N>=N1 THEN 810
790 IF MID(A$,1%,1%)='Y' THEN PRINTIN 'BUFF @ 'K;'CHAR Z1 ='Z1;   '     T='T
800 N1=N
810 R4=R4+1
812 IF R4>200+INT(RND*50) THEN 830
813 IF I<145.625 THEN IF R4>5 THEN GO TO 830
820 RETURN
830 PRINT P1, I;R4
840 R3=INT(RND*9)
850 A3=R3;R4=O
852 I=150=.625*A3
853 A=I−S
854 O1−150
855 N1=O
880 P1=P1*1:IF P1>P2 THEN 900
888 GO TO 820
900 PRINT' ENTERING SUBROUTINE TO CHANGE VALUES IN THE M2 ARRAY'
901 PRINT' TO SKIP THIS SUBROUTINE TYPE A CELL VALUE GREATER THAN 182'
902 INPUT'CELL' ;Z2
903 IF Z2>127 THEN GO TO 990
904 INPUT 'VALUE' ;Z3
905 M2(Z2,15)=Z3
906 GO TO 902
990 FOR M=O TO 127
995 PRINT M;M2(M,15),
996 GO TO 1025
1000 FOR A=O TO 7
1010 IF M2(M,A) O THEN PRINT USING '####' ,M2(M,A);
1020 NEXT A
1025 PRINT
1030 NEXT M
1040 IF ERR=28% THEN PRINT' C TRAP' :STOP:RESUME
1044 PRINT 'TO CLOSE FILE TYPE: CONT ':STOP
1045 CLOSE 2%
1050 END |

| STOP BIT RUNNING PROGRAM |
| --- |
| 4 PRINT'THIS IS THE SEVEN BIT SHIFT REG RUNNING PROGRAM'
5 ON ERROR GOTO 1040
7 X$=SYS(CHR$(6%) +CHR$(−7%)
10 INPUT'THE INITIAL OUTPUT CHARACTER LENGTH IN MS IS TO BE'; O2
20 INPUT'THE INITIAL INPUT CHARACTER LENGTH IN MS IS TO BE'; I
25 INPUT'OUTPUT FILE'; D$
    :IF D$" THEN OPEN 'KB:' FOR OUTPUT AS FILE 3%
30 DIM J(10)
40 OPEN 'MS.ARY' AS FILE 2%
    :DIM #2%, M2(127,15)
50 E1=0
56 RANDOMIZE
60 R1=.625
70 INPUT'THE INITIAL WAIT PERIOD IS TO BE';E1
71 E3=E1
80 S=120:L=140
100 INPUT'THE NUMBER OF PASSES IS TO BE';P2
110 INPUT' THE NUMBER OF CHARACTERS FOR EACH PASS IS TO BE';R5
120 A1$=MID(A$,1%,1%)
130 INPUT'DO YOU WANT TO SEE ALL CALCULATIONS' ;B$
140 B1$=MID(B$,1%,1%)
150 IF MID(B$,1%,1%)='Y' THEN PRINT #3%,'   K    Z Z1 N N1    C
    D I   O   F   32NDS'
160 PRINT #3%, 'PASS', 'INPUT LENG', '# OF CHARA', 'A3', 'MIN OUT'
170 A3=0
171 R4=0
172 P1=1
180 S=120:L=140
190 FOR J=0 TO 10
200 J(J)=0
210 NEXT J
220 E=E3 |

-continued
STOP BIT RUNNING PROGRAM

```
230 O=O2
240 T=0:O3=O
250 Z=0:Z1=0
260 A=I−S:B=O−S:E=S−E:C=S−E
270 G=0:N=0:P=O
280 X=0:K=0
290 D=0:Z=1:GO SUB 680
300 N1=0:O1=0
320 Z=Z+1
330 C=C−A : IF C =0 THEN 390
340 GO SUB 680
350 M=0
360 D=D+B
370 IF D S THEN GOTO 630
380 GO TO 320
390 IF MID(B$,1%,1%)='Y' THEN PRINT #5%,'     C=';C
400 IF J(O)>4 THEN J(1)=1 ELSE J(1)=0
410 FOR J=9 TO 2 STEP−1
420 J(J)=J(J−1)
430 NEXT J
440 FOR J=8 TO 2 STEP−1
450 IF J(J)=1 THEN J(10)=J(10)+2**(J−2)
455 NEXT J
456 T=M2(J(10),15): IF T>0 THEN GO TO 500
457 IF T=0 AND J(10)=0 THEN GO TO 500
460 GO TO 491
461 PRINT J(0);
470 FOR J=2 TO 10
480 PRINT J(J);
490 NEXT J
491 IF J(10)>127 THEN STOP
492 A4=J(10)
493 M2(A4,A3)=A3
494 GO TO 500
498 PRINT M2(A4,A3)
500 J(0)=0: J(10)=0
510 IF M=1 THEN D=D+S:M=0
520 C=C+S:D=(D+0)−(2*S)
530 IF D>=0 THEN GO TO 570
540 F=0−D: IF N 0 THEN F=0
550 GO SUB 680
560 GO TO 590
570 GO SUB 680
580 GO TO 380
590 IF N>0 THEN GOTO 600
600 Z=0:N=N−1:IF N<0 THEN N=0: : Q=1
610 B=0−S:IF Q=0 THEN D=D+0=B:GOTO 320
620 GOTO 310
630 IF C−A<=0 THEN GOTO 380
640 D=D−S:M=1:B=0−S:N=N+1:IF N>P THEN P=N
650 Z1=Z
660 GO TO 670
670 Z=0:GO TO 320
680 K=K+1
690 J(0)=J(0)+1
700 O=G−T*R1
710 IF MID(B$,1%,1%)='Y' THEN PRINT #3%, USING'##### ##### ## ## ## ',K;Z;Z1;N;N1
712 IF MID(B$,1%,1%)='Y'THEN PRINT #3%, USING'###.### ##.### ###.### ## #.### ###.###',C;D;I;O;F;
713 IF MID(B$,1%,1%)='Y'THEN PRINT #3%, USING' ###.###',(I−0)/.625
720 F=0
730 IF O<L THEN O=L
740 IF O>=O1 THEN 760
750 O1=0
760 IF O<L THEN O=L
770 B=0−S
780 IF N<=N1 THEN 810
790 IF MID(A$,1%,1%)='Y'THE PRINTIN 'BUFF @'K;' CHAR Z1 ='Z1;     ' T='T
800 N1=N
810 R4=R4+1
812 IF R4 =R5 THEN 830
813 IF I<145.625 THEN IF R4>5 THEN GO TO 830
820 RETURN
830 PRINT #3%, P1, I, R4,A3,O1,N,N1
840 R3=INT(RND*9)
850 A3=R3;R4=0
852 I=150−INT(RND:5000)/1000
853 A=I−S
854 O1=150
855 N1=0
```

-continued

STOP BIT RUNNING PROGRAM

```
880 P1=P1+1: IF P1>P2 THEN 990
888 GO TO 820
990 FOR M=0 TO 127
995 PRINT M; M2(M,15),
1000 FOR A=0 TO 7
1010 IF M2(M,A) 0 THEN PRINT USING '####',M2(M,A);
1020 NEXT A
1025 PRINT
1030 NEXT M
1040 CLOSE 1%,3%
1045 CLOSE 1%
1050 END
```

The four bits outputted from PROM 326 are inputted as the parallel input data of down counter 336. The clock signal on line 122 clocks the down counter 336, beginning at the count that is loaded from the PROM 326, down to a count of 0. At a count of 0, the BORROW signal on the output of counter 336 will go true. OR gate 342 inverts that signal to generate $\overline{BORROW}$. The four bit count from PROM 326 is loaded into down counter 336 by the signal LOAD generated by stop bit delay load 132. Referring to FIG. 5(a), as long as LOAD is true, the input data to down counter 336 is locked out. When the signal LOAD goes false, the parallel data inputs to down counter 336 are loaded into the counter. The signal LOAD goes false at the end of the transmission of a character. Referring to FIG. 5(c), the signal $\overline{BORROW}$, that is generated when down counter 336 reaches a count of 0, causes LOAD to go false. When TBRE goes true, signaling that the next character has been moved into position for transmitting, LOAD goes true and returns to a logic 1.

Stop Bit Delay Load 132 (FIG. 3(b))

Refer to FIG. 3(b), stop bit delay load 132 generates the LOAD signal that loads down counter 336 with a four bit count that, when counted down to 0 at the clock frequency on line 122, generates the variable portion of the character stop bit. The signal LOAD is generated as follows: The Q output of D flip-flop 334 is the signal LOAD. Flip-flop 344 responds to three input signals. The clear input is the signal $\overline{BORROW}$ from OR gate 342, the clock input is the signal TBRE from UART 118, and the preset input is the $\overline{Q}$ output of one-shot 352. One-shot 352 is triggered by the signal TRE inputted from UART 118 provided that at least one skip has occurred in LOAD DATA. That is, that one-shot 304 of skip indicator 104 has timed out clocking flip-flop 348 into a logic one.

As a result, when $\overline{BORROW}$ goes from a logic 1 to a logic 0, flip-flop 344 will be cleared and the signal LOAD will be false. When one-shot 352 is triggered, the preset to flip-flop 344, which is tied to the $\overline{Q}$ output of one-shot 352, goes from a logic 1 to a logic 0. This sets flip-flop 334 to a logic 1 and assures that LOAD is true. The leading edge of signal TBRE clocks flip-flop 344 to a logic 1 so that LOAD goes true. Thus there are two modes by which flip-flop 344 is set to a logic 1, assuring that LOAD is true when down counter 336 is counted down.

Referring now to FIG. 5(a), 5(b), 5(c) and FIG. 3(b), a sequence of LOAD DATA pulses occurring at a 120 millisecond rate are shown (FIG. 5(a)) having a skip followed by a pause in the occurrence of LOAD DATA pulses. FIGS. 5(b) and 5(c) illustrate the timing relationship between the input and output signals of the stop bit delay load 132 on an expanded time scale from that shown in FIG. 5(a). FIG. 5(c) illustrates the time relationship during the transmission of data characters within a frame. For those characters, the signal $\overline{BORROW}$, that goes true at the end of the variable portion of the stop bit for the character being transmitted, clears flip-flop 344, causing LOAD to go false. With LOAD false, down counter 336 is loaded with a stop bit variable portion count from the output of PROM 326 needed by the next character to be transmitted. With the positive transition of TBRE, flip-flop 344 is clocked back into a logic 1 state causing LOAD to go true where it remains until the next occurrence of the signal $\overline{BORROW}$.

Illustrated in FIG. 5(a) is the signal 108 that is outputted by the skip indicator 104 to the stop bit delay load 132. When a skip occurs in LOAD DATA pulses, the one-shot 304 of the skip indicator 104 (see FIG. 3(a)) times out and generates a short duration pulse on signal line 108, which clocks flip-flop 348 of stop bit delay load 132 into a logic 1. Referring to FIG. 3, with the Q output of flip-flop 348 at a logic 1, one input to AND gate 350 is enabled. Signal TRE is inputted to inverter 346, whose output is the other input of AND gate 350. The output of AND gate 350 triggers one-shot 352 on transitions from logic 0 to logic 1 which occur when both input signals of AND gate 350 are at a logic 1. The $\overline{Q}$ output of one-shot 352 pulses the preset input of flip-flop 344 to preset that flip-flop to a logic 1 state. The output of one-shot 352 also pulses the clear input of flip-flop 348 clearing the enabling signal to AND gate 350. The signal TRE is used to trigger one-shot 352 to preset flip-flop 344 and thereby cause the signal LOAD to be true because, when a pause has occurred in LOAD DATA, the next occurrence of a LOAD DATA starts the transmission of that character when TRE goes false.

It is desirable to have LOAD go true at this time, so that the variable length data for the stop bit of the next character to be transmitted can be loaded into the down counter 336. FIG. 5(b) illustrates what occurs with LOAD DATA following a skip or a pause in the occurrences of that signal. Since at least one occurrence of the pulse on signal line 108 will occur for the skip indicator 104 if one or more skips occur in LOAD DATA, signal 108 will have clocked flip-flop 348 into an enabling state so that when the signal TRE switches from a logic 1 to a logic 0, one-shot 352 will be triggered. At this time, LOAD was false, having been set there by the last occurrence of the signal $\overline{BORROW}$, but will now be switched true. During the skip and pause that occurred in the signal LOAD DATA, the stop bit delay generator 112 has been monitoring the occurrences of the signal on line 110 from one-shot 304 to continue to update the contents of the seven-stage shift register 324 and 322. Thus, when the next LOAD DATA occurs following the skip or pause, the output of the PROM 326 will reflect the stop bit delay length desired for the next character to be transmitted. As previously discussed, the delay length number from PROM 326 is loaded into down counter 336 when LOAD goes true.

In summary, the pseudo-transparent stop bit generator described above operates to generate a variable length stop bit in which the stop bit terminates the data transmitted between terminals and their terminator units. In the computer-controlled switching system, characters received at a calling terminator unit are transferred to the called terminator unit. During this transfer, a LOAD DATA signal is generated by the CPU to load into the called terminator unit the character information from the calling terminator. Because of the timing relationship between the rate at which the terminator unit receives the character information from its terminal and the sample ate at which the CPU pools each terminator unit on the system, a sequence of LOAD DATA signals is generated in which gaps or skips occur. Different numbers of signals occur between gaps for different transmission times from terminal to terminator. By monitoring the number of LOAD DATA signals between skips for previous skips, a periodic adjustment can be made to the stop bit length to make the transmission time between the called terminator and its terminal the same as between the calling terminal and its terminator. This adjustment is made by having a digital code generated by the pattern in the previous seven skip intervals address a PROM which outputs a delay count number. This count number is counted down to zero so that the time required to do the counting determines a variable time interval that is added to the stop bit fixed time interval to generate the total stop bit time.

In describing the invention, reference has been made to its preferred embodiment. However, those skilled in the art and familiar with the disclosure of the invention may recognize additions, deletions, substitutions or other modifications which would fall within the purview of the invention as defined in the appended claims.

What is claimed is:

1. In a line terminator unit for use in a computer-controlled switching system, said computer generating a sequence of data transfer signals in the transfer of data between terminator units in the system, said transfer signals having a period equal to the time between successive transfer signals, said terminator unit including,
    (i) a keyer for transmitting serial data to a terminal, said data having a stop bit,
    (ii) a receiver for receiving serial data from said terminal,
    (iii) interface means for communication between said computer and said terminator unit, and
    (iv) a parallel-to-serial converter for converting between parallel data of said computer and serial data of said terminal,
the improvement comprising:
    (a) a skip detector for generating a clock signal when the absence of a data transfer signal in said sequence of data transfer signals is detected; and
    (b) a stop bit generator responsive to said data transfer signals and said clock signal, for generating a variable length stop bit for the data transferred to said terminal by generating a stop bit time interval that varies in length according to the number of data transfer signals occurring between previous clock pulses.

2. The terminator unit in accordance with claim 1, wherein said stop bit generator comprises:
    (a) a counter for counting the number of data transfer signals that occur between said clock signals, said counter generating a count-indicating signal having first and second states depending upon whether the count in said counter is greater than or less than a given count number;
    (b) a first memory responsive to said clock signal, for storing said count-indicating signal, said memory having stored therein a plurality of preceding count-indicating signals;
    (c) a second memory addressed by said stored count-indicating signals in said first memory, for outputting a time interval count; and
    (d) means for measuring a time interval determined by said time interval count, said measured time interval added to a fixed time interval to generate said stop bit length.

3. The device in accordance with claim 2 wherein said time interval measuring means comprises:
    (a) a down counter;
    (b) a count load signal generator responsive to said parallel-to-serial converter and said down counter for loading said time interval count into said down counter; and
    (c) a down counter clock signal for counting down said down counter from said time interval count to a count of zero.

4. The device in accordance with claim 2, wherein said first memory is a shift register.

5. The device in accordance with claim 2, wherein said second memory is a programmable read-only memory.

6. The device in accordance with claim 2, wherein said counter is a shift register.

7. The device in accordance with claim 1, wherein said skip detector includes a timer that responds to each said data transfer signal and each said clock signal to produce a detector time interval that is greater in length than the time for one of said data transfer signal periods but less than the time for two of said data transfer signal periods.

8. The device in accordance with claim 7, wherein said skip detector generates said clock signal at the end of said detector time interval.

9. The device in accordance with claim 7, wherein said timer is a retriggerable one-shot.

10. The device in accordance with claim 2, wherein said given count number is four.

11. The device in accordance with claim 2, wherein said plurality of preceding count indicating signals stored in said first memory is seven.

12. The device in accordance with claim 3, wherein said skip detector comprises a timer responsive to said clock signal and said transfer signals for measuring a detector time interval greater than one but less than two of said transfer signal periods.

13. In an improved circuit for generating a stop bit for use in a line terminator unit, said terminator unit having a transmitter for transmitting serial data from said terminator unit to a terminal, said serial data having a stop bit, the improvement comprising:
    (a) a detector for detecting the absence of a data transfer signal in a sequence of data transfer signals, said transfer signals generated in the transfer of data between terminator units, said detector generating a clock signal when said absence is detected; and (b) means responsive to said transfer signals and said detector, for generating a variable length stop bit by generating a stop bit time interval that varies in length according to the number of data transfer signals occurring between previous clock signals.

14. The device in accordance with claim 13 wherein said means for generating a variable length stop bit comprises:
(a) a counter responsive to said transfer signals for generating range determination signals indicating whether the number of said transfer signals occurring between said clock signals is greater than or less than a given number; and
(b) a variable time interval generator responsive to said range determination signals for generating a variable time interval to vary the length of said stop bit.

15. The device in accordance with claim 14, wherein said variable time interval generator comprises:
(a) a first memory responsive to said clock signal for storing a number of preceding determination signals;
(b) a second memory addressed by said stored range determination signals in said first memory, for outputting a time interval count; and
(c) means for measuring a time interval determined by said time interval count.

16. The device in accordance with claim 15, wherein said means for measuring a time interval comprises:
(a) a counter;
(b) a count load signal generator responsive to said clock and said transmitter for loading said time interval count into said counter; and
(c) a counter clock signal for counting down said counter from said loaded time interval count to a count of zero.

17. The device in accordance with claim 15, wherein said first memory is a shift register.

18. The device in accordance with claim 15, wherein said second memory is a programmable read-only memory.

19. A line terminator unit for use in a computer-controlled switching system in which a sequence of data transfer signals are generated by the computer in the transfer of data between terminator units in the system, said terminator unit comprising:
(a) a keyer for transmitting serial data to a terminal, said serial data having a stop bit;
(b) a receiver for receiving serial data from said terminal;
(c) an interface for commumicating between said computer and each said terminator unit;
(d) a parallel-to-serial converter for converting between parallel data of said computer and serial data of said terminal;

(e) a skip detector, for detecting the absence of a data transfer signal in the sequence of said transfer signals, and for generating a first clock signal when said absence is detected; and (f) a stop bit generator responsive to said transfer signals and said first clock signal, for generating a variable length stop bit by generating a stop bit time interval that varies in length according to the number of data transfer signals occurring between previous first clock signals.

20. The device in accordance with claim 19, wherein said stop bit generator comprises:
(a) a first counter for counting the number of data transfer signals occurring between said first clock signals, said counter generating a count-indicating signal having first and second states depending upon whether the count in said counter is greater than or less than a given count number;
(b) a first memory responsive to said first clock signal for storing said count-indicating signal, said memory storing therein a plurality of preceding count indicating signals;
(c) a second memory addressed by said stored count indicating-signals in said first memory for outputting a time-interval count;
(d) a second counter;
(e) a count load signal generator responsive to said first clock signal and said converter for loading said time interval count into said second counter; and
(f) a second clock signal for counting down said second counter from said time-interval count to a count of zero.

21. In a device which transmits a character on each occurrence of a character-transmit command in a sequence of character-transmit commands, said character transmitted in a serial mode and ending with a stop bit, a circuit for generating said stop bit, comprising:
(a) skip indicator means, for detecting the absence of a character-transmit command in the sequence of character-transmit commands, and for generating a clock pulse when said absence occurs;
(b) a counter for counting the number of said commands occurring between said clock pulses, and for determining if said number is greater than or less than a minimum number;
(c) a first memory for storing said determination, said first memory having stored therein a plurality of preceeding determinations;
(d) a second memory addressed by the contents of said first memory, for outputting a time interval count; and
(e) a time-interval generator responsive to said time-interval count, for generating a timeinterval that determines the length of said stop bit.

22. The device in accordance with claim 21, wherein said minimum number is four.

23. The device in accordance with claim 21 wherein said plurality of preceding determinations is seven.

* * * * *

UNITED STATES PATENT AND TRADEMARK OFFICE
CERTIFICATE OF CORRECTION

PATENT NO. : 4,210,777
DATED : July 1, 1980
INVENTOR(S) : John J. Bowerman and John F. Wilson It is certified that error appears in the above-identified patent and that said Letters Patent are hereby corrected as shown below:

Column 13, line 14 "Be'" should read --BE'--.

Column 15, line 4 "O>L" should read --O<L--;
            line 7 "O>L" should read --O<L--;
            line 9 "N>=N1" should read --N<=N1--;
            line 18 "A3=R3;R4=0" should read --A3=R3:R4=0--;
            line 53 "'MS.ARY'" should read --'M2.ARY'--.

Column 17, line 46 "N=0::Q=1" should read --N=0:Q=1--;
            line 77 "A3=R3;R4=0" should read --A3=R3:R4=0--;
            line 78 "I=150-INT(RND:5000)/1000" should read --I=150-INT(RND*5000)/1000--.

Signed and Sealed this

Ninth Day of June 1981

[SEAL]

Attest:

RENE D. TEGTMEYER

Attesting Officer     Acting Commissioner of Patents and Trademarks